United States Patent [19]

Matsuda et al.

[11] 3,708,630

[45] Jan. 2, 1973

[54] TELEPHONE CIRCUITS UTILIZING ACTIVE ELEMENTS

[75] Inventors: Ryoichi Matsuda; Masaaki Terai, both of Tokyo; Yasuo Hojyo, Sayama, all of Japan

[73] Assignee: Nippon Telegraph and Telephone Public Corporation, Tokyo, Japan

[22] Filed: Feb. 4, 1971

[21] Appl. No.: 112,663

[30] Foreign Application Priority Data

Feb. 7, 1970 Japan ................................45/10509

[52] U.S. Cl. ................................................179/81 A

[51] Int. Cl. ................................................H04m 1/58

[58] Field of Search .............179/81 A, 81 R, 170 NC

[56] References Cited

UNITED STATES PATENTS

| | | | |
|---|---|---|---|
| 3,546,395 | 12/1970 | Schuh | 179/81 A |
| 3,582,563 | 6/1971 | Cragg | 179/81 R |
| 3,582,564 | 6/1971 | Knauer | 179/81 A |
| 2,645,681 | 7/1953 | Green | 179/81 A |
| 3,597,550 | 8/1971 | Sternbeck | 179/81 A |

*Primary Examiner*—Kathleen H. Claffy
*Assistant Examiner*—William A. Helvestine
*Attorney*—Chittick, Pfund, Birch, Samuels & Gauthier

[57] ABSTRACT

The telephone circuit comprises transmitting means, receiving means, a balancing network, a transistor circuit connected between the transmitting means, receiving means and telephone lines, a D.C. supply circuit for applying a constant voltage to the transmitting means from the telephone circuit and variable impedance elements respectively connected across the transmitting means and the receiving means, the variable impedance elements varying their impedance according to the D.C. condition at line terminals.

12 Claims, 4 Drawing Figures

INVENTORS
RYOICHI MATSUDA
MASAAKI TERAI
YASUO HOJYO

BY Chittick, Pfund, Birch, Samuels & Gauthier
ATTORNEYS

INVENTORS
RYOICHI MATSUDA
MASAAKI TERAI
YASUO HOJYO

BY Chittick, Pfund, Birch, Samuels & Gauthier
ATTORNEYS

TELEPHONE CIRCUITS UTILIZING ACTIVE ELEMENTS

BACKGROUND OF THE INVENTION

This invention relates to a telephone circuit and more particularly to an anti-sidetone telephone circuit not utilizing a hybrid transformer and which is suitable to be fabricated as an integrated circuit. The novel telephone circuit utilizing an active element can automatically and satisfactorily suppress the side tone and provide an adequate level of speech irrespective of the length of the telephone lines to which the telephone set is connected.

The anti-sidetone circuit now widely used in conventional telephone sets comprises a hybrid coil connected and arranged so as to prevent two sets of terminal pairs from being mutually coupled electrically. With such an anti-sidetone circuit even when the hybrid coil is ideal, attenuations of 3dB are unavoidable in both transmission and reception of the speech. Moreover, from the standpoint of economy, since the hybrid coils actually used in commercial telephone sets are rather simple, the attenuation of the transmitted and received speeches is generally larger than 3dB.

Although the hybrid transformer is advantageous from the standpoints of durability and simplicity because it is comprised by a magnetic core and coils it increases the physical dimension and weight of the telephone set.

Furthermore, in the conventional telephone circuit, in order to prevent excessive sending and receiving levels caused by a short subscriber's line, the extent of attenuation is manually adjusted. Such a manual adjustment, however, is trouble-some so that it is highly desirable to provide means capable of automatically adjusting the sending and the receiving level in accordance with the line loss.

To eliminate the above described defects of the hybrid transformer, a new type of an anti-sidetone circuit not utilizing the hybrid transformer has recently been proposed. Thus, for example, U.S. Pat. No. 3,440,367 discloses a combination of a resistance Wheatstone bridge and an amplifier, U.S. Pat. No. 3,227,812 discloses an arrangement wherein a portion of the transmission output appearing across the transmission terminals is applied through an amplifier to the receiving side with the opposite phase for preventing the side tone and U.S. Pat. No. 3,180,047 discloses an arrangement wherein the transmission output is applied to a pair of amplifiers of the opposite phase and the outputs from the amplifiers are combined in the receiver for suppressing the side tone. Another approach involves an arrangement by which a transistor is included in an anti-sidetone circuit and the receiver is connected across two points between which the receiver outputs appear at the same phase.

However, these arrangements are not advantageous on the following grounds. More particularly, with a simple circuit arrangement, the attenuation of the transmitted and received speech is increased but the decrease in the attenuation can be attained only with complicated circuit construction. Where the transmitter is energized from a local office battery the operating points of the active elements vary greatly for different lengths of the line thus resulting in disportion as well as variation of the gain. On the other hand, if the circuit is constructed to have a constant D.C. operating point, the non-linear elements included in the circuit become difficult to operate thus effecting the ability of the automatic level control. Moreover, as the operation of the circuit is largely influenced by the difference in the operating characteristics of the elements it becomes difficult to fabricate the circuit with semiconductor integrated circuit elements. For this reason, such a design is not applicable to telephone circuits.

SUMMARY OF THE INVENTION

It is therefore an object of this invention to provide a novel telephone circuit utilizing active elements, which is simple in circuit construction and can greatly decrease the attenuation of the sending and receiving level.

Another object of this invention is to provide an improved telephone circuit provided with a power supply circuit which can always maintain a constant D.C. condition in the telephone circuit and does not affect in any way the A.C. condition thereof thus effectively preventing the distortion of the sending and receiving level in the gain caused by the difference in the length of the subscriber's line.

Still another object of this invention is to provide a novel telephone circuit wherein elements which vary their impedances according to the D.C. voltage appearing across input terminals of a telephone set are associated with both transmitter and receiver, thereby automatically always maintaining the sending and receiving level at a proper level.

Further object of this invention is to provide an improved telephone circuit of small size and light weight by fabricating the circuit with component elements other than the transmitter, receiver and condensers that can be fabricated into an integrated circuit.

According to a broad aspect of this invention there is provided a telephone circuit comprising a three terminal transistor circuit including an input terminal, an output terminal and a common terminal ; receiving means having first and second terminals ; the first terminal being connected to the common terminal of the transistor circuit ; transmitting means including a first terminal connected to the input terminal of the transistor circuit and a second terminal connected to the second terminal of the receiving means ; telephone lines connected between the output terminal of the transistor circuit and the second terminal of the receiver means ; a balancing network connected between the input terminal and common terminal of the transistor circuit ; a D.C. supply circuit connected between the telephone lines and the transmitting means for supplying current to the transmitting means ; a first variable impedance element connected in parallel with the transmitting means ; the first variable impedance element varying its impedance in accordance with the D.C. voltage of the telephone lines ; and a second variable impedance element connected in parallel with the receiving means; the second variable impedance means varying its impedance in accordance with the D.C. voltage of the telephone lines.

According to a more specific aspect of this invention there is provided a telephone circuit comprising a potentiometer having an output tap and connected across telephone lines; a D.C. supply circuit connected in parallel with the potentiometer and including a constant current circuit and biasing means for biasing the constant current circuit for providing a constant voltage ; a transistor including an output terminal, an input terminal and a common terminal ; the output terminal being connected to one of the telephone lines ; receiving means with one terminal connected to the common terminal of the transistor and the other terminal connected to the other of the telephone lines ; a balancing network with one terminal connected to the input terminal of the transistor and the other terminal to the common terminal of the transistor ; transmitting means including a sending amplifier having an output terminal connected to the input terminal of the transistor and constant voltage input terminals energized by the constant voltage, and a transmitter having two terminals connected to another input terminals of the sending amplifier ; a first field effect transistor ( hereinafter merely called as FET ) having a drain terminal and a source terminal which are connected in parallel with the transmitter ; and a second FET having a drain terminal connected to the first terminal of the receiving means and a gate terminal connected to the gate terminal of the first FET ; the output tap of the potentiometer being connected to the gate terminals of the first and second FETs ; the biasing means of the D.C. supply circuit being connected to the constant voltage input terminals of the sending amplifier; and the intermediate point of the biasing means being connected to the source terminals of the first and second FETs.

The active elements or the FETs function to greatly reduce the transmitted and received level. Moreover, the potentiometer cooperates with the FETs to automatically adjust the receiving and sending level of the speech and to prevent distortion of the speech and variation in the level. Further, it is a feature of this invention that various circuit elements other than the transmitter, receiver and capacitors can be fabricated as an integrated circuit on a common substrate.

BRIEF DESCRIPTION OF THE DRAWINGS

Further objects and advantages of the invention can be more fully understood from the following detailed description taken in conjunction with the accompanying drawings in which.

DESCRIPTION OF THE PREFERRED EMBODIMENTS

Figure 1:
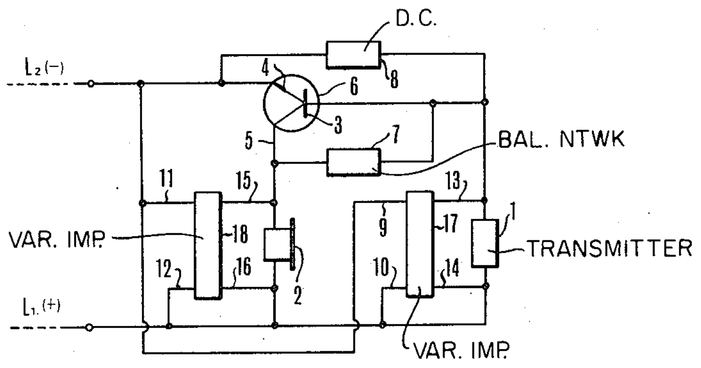
FIG. 1 is a circuit diagram to explain the principle of the novel telephone circuit.

With reference first to FIG. 1 of the accompanying drawing, the novel telephone circuit shown therein comprises a transmitting means 1 and a receiver 2 of the electromagnetic type. There is provided a transistor 6 including a base electrode 3, an emitter electrode 4 and a collector electrode 5, the emitter 4 being connected with one telephone line $L_2$. One terminal of transmitter means 1 is connected to base electrode 3 of transistor 6 whereas the other terminal to the other telephone line $L_1$. One terminal of receiver 2 is connected to the collector electrode 5 of transistor 6 and the other terminal to telephone line $L_1$ and to the other terminal of the transmitting means. A two terminal impedance circuit or a balancing network 7 having an impedance equal or substantially equal to the line impedance is connected between base electrode 3 and collector electrode 5 of the transistor 6, and a D.C. supply circuit 8 for transmitting means 1 is connected between line $L_2$ and the juncture between base electrode 3 and the one terminal of transmitting means 1. A first variable impedance element 17 with a pair of control terminals 9 and 10 connected across lines $L_2$ and $L_1$ is connected across transmitting means 1 through another pair of variable impedance terminals 13 and 14. In the same manner, a second variable impedance element 18 having a pair of control terminals 11 and 12 connected to lines $L_2$ and $L_1$, respectively, is connected across receiver 2 through a pair of variable impedance terminals 15 and 16.

The principle of operation of the novel telephone circuit illustrated in FIG. 1 will now be considered with reference to the D.C. operation and the A.C. operation thereof. It is to be understood that a D.C. voltage having a polarity as indicated is supplied to transistor 6 and transmitter 1 from a source in another telephone office, not shown, via telephone lines $L_1$ and $L_2$.

D.C. OPERATION

Under this assumption the power is supplied to transmitting means 1 via a circuit that can be traced through line $L_1$ (+), transmitting means 1, D.C. supply circuit 8 and through line $L_2$ (−). Usually a constant current circuit is used as the D.C. supply circuit 8 so that the voltage drop across transmitting means 1 is constant irrespective of the variation in the line voltage whereby the base potential of transistor 6 is maintained at a constant value thus assuring stable operation thereof an well as constant sensitivity of the transmitting means 1. Under these circumstances, as it is possible to set the A.C. resistance of the D.C. supply circuit 8 at a sufficiently high value it is possible to neglect this circuit when considering the A.C. operation.

A.C. OPERATION

The speech signal voltage generated by the transmitting means 1 is applied to the base electrode 3 of transistor 6 and this voltage appears on the emitter electrode 4 with the same phase. This sending signal is then transmitted over telephone lines $L_1$ and $L_2$. At the same time, the speech signal voltage appearing on the collector electrode 5 at the opposite phase is applied to the receiver whereby a side tone is created. However, the balancing network 7 acts as a negative feedback loop of transistor 6 for the side tone voltage created in the receiver 2, this decreasing the magnitude of the side tone. When the impedance of the balancing network 7 is adjusted to be equal to the line impedance, no side tone voltage would be created by the receiver. For this reason, transistor 6 operates as the common collector mode for the sending signal so that the sending signal voltage generated by transmitter 1 will be transmitted over telephone lines $L_1$ and $L_2$ at the same phase and same voltage. On the other hand transistor 6 operates as the common base mode for the receiving signal incoming over telephone lines $L_1$ and $L_2$ to supply the amplified signal to receiver 2. To simplify the description, let us consider the condition necessary for suppressing the side tone by neglecting D.C. supply circuit 8 and variable impedance elements 17 and 18. Let $Z_T$ represent the output impedance of transmitting means 1, $Z_R$ the input impedance of receiver 2, $Z_L$ the line impedance and $Z_N$ the impedance of the balancing network 7. Further, it is assumed that transistor 6 has ideal characteristics, the side tone current $i_s$ flowing through receiver 2 caused by the sending signal voltage $V_T$ created by the transmitting means is expressed by the equation $$i_s=\left(\frac{Z_N}{Z_L}-1\right)\cdot\frac{V_T}{Z_N+Z_R} \quad (1)$$

From equation (1), the condition necessary for suppressing the side tone is given by $$Z_N=Z_L \quad (2)$$

The working attenuation $b_T$ supplied to the telephone lines $L_1$ and $L_2$ from transmitting means 1 and the working attenuation $b_R$ supplied to receiver 2 from the lines under these conditions are expressed by the following equations:

$$b_T=20\log\left|\frac{Z_T+Z_L}{2\sqrt{Z_TZ_L}}\right|(dB) \quad (3)$$

$$b_R=20\log\left|\frac{Z_R+Z_L}{2\sqrt{Z_RZ_L}}\right|(dB) \quad (4)$$

From equations (3) and (4) it will be evident that by the suitable selection of $Z_T$ and $Z_R$ it becomes possible to make sufficiently small working attenuations $b_T$ and $b_R$. For example, if $Z_T = Z_R = 600$ ohms and $Z_L = 600$ ohms then $b_T = b_R = 0$dB, which is extremely small when compared with the attenuations obtainable with conventional telephone circuits.

In the first variable impedance element 17 shown in FIG. 1, the A.C. impedance across its output terminals 13 and 14 decreases as the D.C. voltage impressed across control terminals 9 and 10 increases and the second variable impedance element 18 has similar characteristics as the first variable impedance element. Accordingly, when the length of the telephone line connected with the novel telephone circuit is short, the voltages impressed across the control terminals of variable impedance elements 17 and 18 are increased to shunt transmitting means 1 and receiver 2 with low impedances thus automatically adjusting the levels of the transmitting and receiving signals to a proper level. Variable impedance elements 17 and 18 of such characteristics can be readily provided by means of metal-oxide-semiconductor type (hereinafter merely called as MOS) FETs with their gate and source electrodes utilized as the control terminals and their source and drain electrodes as the variable or output terminals. However, the D.C. voltage should not be applied across the drain and source electrodes.

Figure 2:
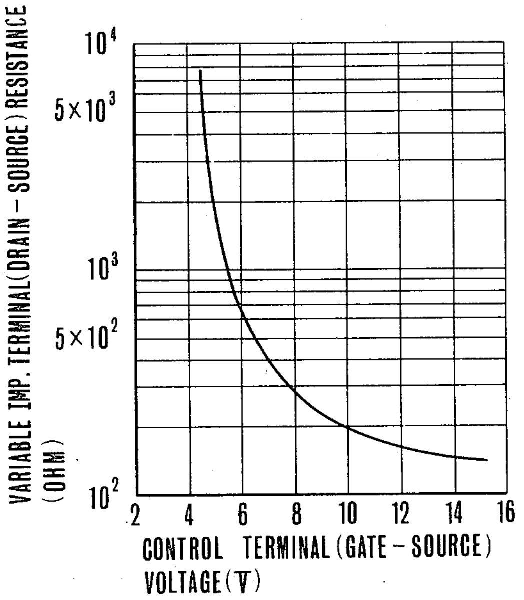
FIG. 2 is a plot of a characteristic curve of a variable impedance element employed in this invention.

The variable impedance characteristic of a MOS FET is shown in FIG. 2. By using the MOS FET as the variable impedance elements it is possible to fabricate them as an integrated circuit together with another semiconductor elements of the telephone circuit.

Figure 3:
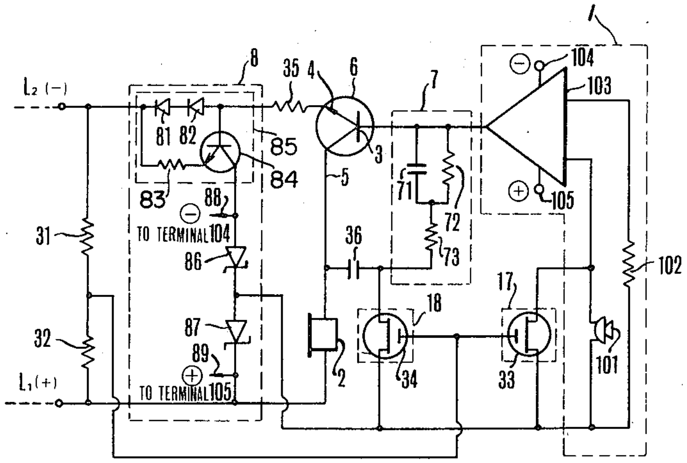
FIG. 3 is a connection diagram of one embodiment of this novel telephone circuit and FIG. 4 illustrates a modified power supply circuit employed in this invention.

FIG. 3 shows one embodiment of the novel telephone circuit which can be readily formed as an integrated circuit by employing an electromagnetic transmitter and an amplifier as the transmitting means, an electromagnetic receiver as the receiving means and MOS FETs as the variable impedance elements. Component elements identical to those shown in FIG. 1 are designated by the same reference numerals.

More particularly, in the circuit shown in FIG. 3, the transmitting means 1 is comprised by an electromagnetic transmitter 101, a resistor 102 and an sending amplifier 103 having terminals 104 and 105 connected to a source of power, not shown. The balancing network 7 comprises a parallel combination of a capacitor 71 and a resistor 72, and a resistor 73 connected in series with the parallel combination. The D.C. supply circuit for transmitting means 1 is connnected across lines $L_1$ and $L_2$ and comprises a constant current circuit 85 comprised by two diodes 81 and 82, a transistor 84 and a resistor connected between the emitter electrode of transistor 84 and line $L_2$, and constant voltage diodes, for example, Zener diodes 86 and 87, connected between the collector electrode of transistor 84 and line $L_1$. Diodes 81 and 82 and resistor 83 are connected in series between the base and emitter electrodes of transistor 84. Resistors 31 and 32 are connected in series across lines $L_1$ and $L_2$ to form a potentiometer, and the juncture between resistors 31 and 32 is connected to the gate electrodes of MOS FETs 33 and 34 serving as said variable impedance elements 17 and 18, respectively for automatically adjusting the speech level and the level of the receiving signal. A bias resistor 35 is connected between the base electrode of transistor 84 and the emitter electrode 4 of transistor 6 for determining the collector potential of the latter transistor. A capacitor 36 is provided to from an A.C. circuit between one terminal of the balancing network 7 and the receiving means 2. Output terminals 88 and 89 across Zener diodes 86 and 87 which are biased by the current supplied from the D.C. supply circuit 8 are connected to voltage supply terminals 104 and 105, respectively, of the sending amplifier 103 included in transmitting means 1 for supplying to the sending amplifier 103 the positive and negative voltages appearing across serially connected Zener diodes 86 and 87, taking the juncture therebetween as the reference point. The D.C. voltages of the output terminal and of the input terminal of the sending amplifier 103 are selected to be equal to the D.C. voltage appearing at the juncture between Zener diodes 86 and 87. This juncture is also connected to the source electrodes of the MOS FETs 33 and 34 and to one terminal of transmitter 101. For this reason, no D.C. voltage is impressed across the source and drain electrodes of the MOS FETs 33 and 34. The base electrode 3 of transistor 6 is connected to be biased by the D.C. voltage appearing at the output terminal of sending amplifier 103 whereas the collector electrode 5 is biased by the voltage on line $L_1$ through receiver 2.

Since the circuit shown in FIG. 3 operates on the same principle as has been described in connection with FIG. 1 it is believed unnecessary to repeat the same description. However, it is to be emphasized that, according to the present invention utilization of the active elements decreases the attenuation of the sending and receiving signals, that utilization of the potentiometer comprised by resistors 31 and 32, and the variable impedance elements enables automatic adjustment of the speech level and the volume, and that since a constant voltage is supplied to the sending amplifier from the telephone lines it is possible to prevent distortion of the speech as well as variations in the gain. Further, all circuit elements of the novel telephone circuit excepting the electromagnetic transmitter, the electromagnetic receiver and the capacitors can be fabricated on the same substrate as an integrated circuit.

Figure 4:
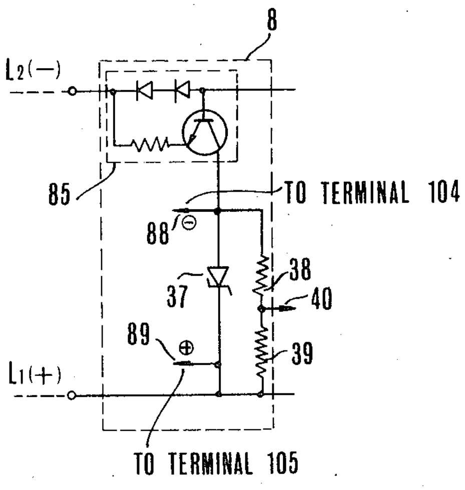

FIG. 4 illustrates another embodiment of the D.C. supply circuit 8. At present, since it is difficult to incorporate a low voltage Zener diode into an integrated circuit, in accordance with this modification, one Zener diode 37 is connected to the constant current circuit 85 and a potentiometer comprising resistors 38 and 39 is connected in parallel with the Zener diode. The middle tap 40 of the potentiometer is connected to the source terminals of MOS FETs 33 and 34 and to one terminal of the transmitting means 1 (see FIG. 1).

While the invention has been shown and described in terms of certain preferred embodiments thereof it will be clear that many changes and modifications will be obvious to one skilled in the art without departing from the true spirit and scope of the invention as defined in the appended claims.

What is claimed is:

1. A telephone circuit comprising a transistor circuit including an input terminal, an output terminal and a common terminal; receiving means having first and second terminals ; said first terminal being connected to said common terminal of said transistor circuit ; transmitting means including a first terminal connected to said input terminal of said transistor circuit and a second terminal connected to said second terminal of said receiving means ; telephone lines connected between said output terminal of said transistor means and the second terminal of said receiving means ; a balancing network connected between said input terminal and said common terminal of said transistor circuit ; a D.C. supply circuit connected between said telephone lines and said transmitting means for supplying current to said transmitting means ; a first variable impedance element connected in parallel with said transmitting means ; and a second variable impedance element connected in parallel with said receiving means ; said first and second variable impedance means varying their impedance in accordance with the D.C. voltage of said telephone lines.

2. The telephone circuit according to claim 1 wherein said transmitting means comprises an electromagnetic transmitter and a sending amplifier connected to said transmitter and supplied with a constant voltage.

3. The telephone circuit according to claim 1 wherein said D.C. supply circuit comprises a constant current circuit connected in parallel with said telephone lines, and biasing means for biasing said constant current circuit to obtain a constant voltage.

4. The telephone circuit according to claim 3 wherein said biasing means includes at least one constant voltage diode.

5. The telephone circuit according to claim 1 wherein said first variable impedance element comprises a field effect transistor having a drain terminal and a source terminal which are connected across said electromagnetic transmitter and a gate terminal connected to means sensitive to the D.C. voltage of said telephone lines.

6. The telephone circuit according to claim 5 wherein said means sensitive to said D.C. voltage comprises a resistance potentiometer connected across said telephone lines.

7. The telephone circuit according to claim 1 wherein said second variable impedance element comprises a field effect transistor having a drain terminal and a source terminal connected across said receiving means and a gate terminal connected to means sensitive to the D.C. voltage of said telephone lines.

8. A telephone circuit comprising a potentiometer having an output tap and connected across telephone lines ; a D.C. supply circuit connnected in parallel with said potentiometer and including a constant current circuit and biasing means for biasing said constant current circuit for providing a constant voltage ; a transistor including an output terminal, an input terminal and a common terminal ; said output terminal being connected to one of said telephone lines ; receiving means with one terminal connected to said common terminal of said transistor and the other terminal connected to the other of said telephone lines ; a balancing network with one terminal connected to said input terminal of said transistor and the other terminal to said common terminal of said transistor ; transmitting means including a sending amplifier having an output terminal connected to said input terminal of said transistor and constant voltage input terminals energized by a said constant voltage, and a transmitter having two terminals connected to another input terminals of said sending amplifier; a first field effect transistor having a drain terminal and a source terminal which are connected in parallel with said transmitter ; and a second field effect transistor having a drain terminal connected to the one end of said receiving means and a gate terminal connected to the gate terminal of said first field effect transistor ; said output tap of said potentiometer being connected to the gate terminals of said first and second field effect transistors ; said biasing means of said D.C. supply circuit being connected to said constant voltage input terminals of said sending amplifier ; and an intermediate point of said biasing means being connected to the source terminals of said first and second field effect transistors.

9. The telephone circuit according to claim 8 wherein said biasing means of said D.C. supply means comprises two serially connected constant voltage diodes and the juncture between said diodes comprises said intermediate point.

10. The telephone circuit according to claim 8 wherein said biasing means of said D.C. supply circuit comprises a single constant voltage diode and a potentiometer connected in parallel with said constant voltage diode, an intermediate tap of said potentiometer being utilized as said intermediate point.

11. The telephone circuit according to claim 8 wherein said balancing network comprises a parallel combination of a capacitor and a resistor, and a resistor connected in series with said parallel combination and wherein said balancing network is connected between said input terminal and said common terminal of said transistor through a capacitor which provides a low impedance path for A.C. components.

12. The telephone circuit according to claim 11 wherein said transistor, resistors, and field effect transistors are fabricated as an integrated circuit on a substrate.

* * * * *